United States Patent
Tanaka et al.

(10) Patent No.: US 6,335,132 B1
(45) Date of Patent: Jan. 1, 2002

(54) ELECTROPHOTOGRAPHIC PHOTOSENSITIVE MEMBER, AND PROCESS CARTRIDGE AND ELECTROPHOTOGRAPHIC APPARATUS INCLUDING THE PHOTOSENSITIVE MEMBER

(75) Inventors: Masato Tanaka; Hidetoshi Hirano, both of Shizuoka-ken; Kan Tanabe, Susono, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,151

(22) Filed: Jun. 21, 2000

(30) Foreign Application Priority Data

Jun. 25, 1999 (JP) .......................................... 11-180847

(51) Int. Cl.$^7$ .............................................. G03G 5/047
(52) U.S. Cl. ...................... 430/59.3; 399/159; 399/111; 430/70; 430/56
(58) Field of Search ............................. 430/59.3, 59.4, 430/59.5, 56, 78, 70; 399/159, 111

(56) References Cited

U.S. PATENT DOCUMENTS

| | | | |
|---|---|---|---|
| 4,898,799 A | 2/1990 | Fujimaki et al. ............... | 430/59 |
| 5,302,479 A | 4/1994 | Daimon et al. ................ | 430/78 |
| 5,358,813 A | 10/1994 | Iijima et al. .................. | 430/59 |
| 5,393,629 A | 2/1995 | Nukada et al. ............... | 430/76 |
| 5,811,212 A | 9/1998 | Tanaka ......................... | 430/58 |
| 5,885,737 A | 3/1999 | Tanaka ......................... | 430/59 |
| 5,932,722 A | 8/1999 | Hirai et al. ................... | 540/139 |

FOREIGN PATENT DOCUMENTS

| | | |
|---|---|---|
| GB | 2233778 | 1/1991 |
| GB | 2292156 | 2/1996 |
| JP | 217050 | 9/1986 |
| JP | 239248 | 10/1986 |
| JP | 67094 | 3/1987 |
| JP | 218768 | 9/1988 |
| JP | 17066 | 1/1989 |
| JP | 98181 | 4/1993 |
| JP | 263007 | 10/1993 |
| JP | 67946 | 3/1998 |

OTHER PUBLICATIONS

Patent Abst. of Japn, vol. 18, No. 146, 3–94 for JP5–323632.
Database WPI, Sect. Ch, Wk. 199716, Derwent Publ., AN 1997–169789, XP002147806.

*Primary Examiner*—Christopher Rodee
(74) *Attorney, Agent, or Firm*—Fitzpatrick, Cella, Harper & Scinto

(57) ABSTRACT

An electrophotographic photosensitive member capable of forming images with less defects, such as ghost, while retaining a high photo-sensitivity, is provided. The photosensitive member includes a support and a photosensitive layer disposed on the support, wherein said photosensitive layer contains a phthalocyanine pigment and an azo calix[n]arene compound represented by the formula (1) below:

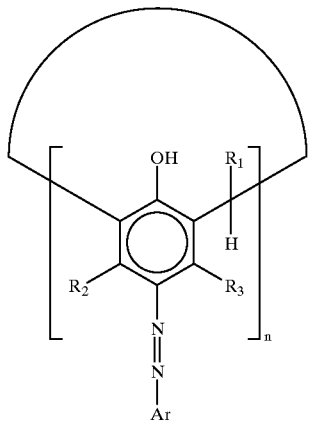

(1)

wherein n denotes an integer of 4–8; $R_1$, $R_2$ and $R_3$ independently denote a hydrogen atom or alkyl group; Ar denotes an aromatic hydrocarbon ring group capable of having a substituent, a heterocyclic group capable of having a substituent, or a combination of a plurality of these groups bonded to each other directly or via a bonding group.

17 Claims, 1 Drawing Sheet

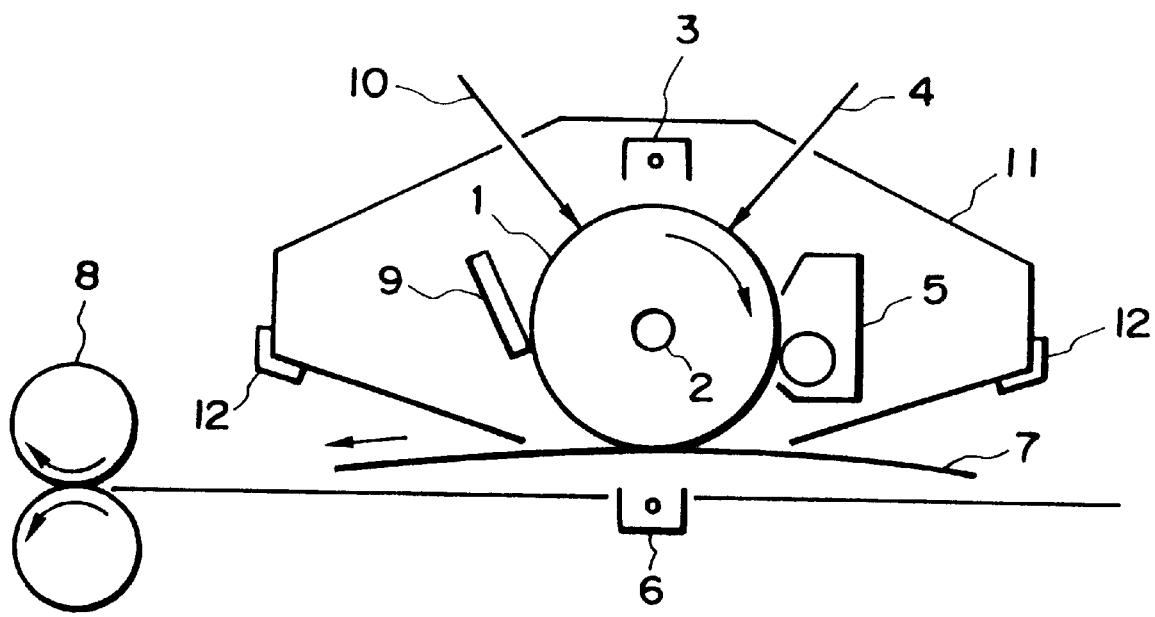

ELECTROPHOTOGRAPHIC PHOTOSENSITIVE MEMBER, AND PROCESS CARTRIDGE AND ELECTROPHOTOGRAPHIC APPARATUS INCLUDING THE PHOTOSENSITIVE MEMBER

FIELD OF THE INVENTION AND RELATED ART

The present invention relates to an electrophotographic photosensitive member, and a process cartridge and an electrophotographic apparatus including the electrophotographic photosensitive member.

As photoconductor materials for electrophotographic photosensitive members, inorganic photoconductors, such as cadmium sulfide, and zinc oxide, have been conventionally used. On the other hand, organic photoconductors, such as polyvinyl carbazole, oxadiazole, azo pigments and phthalocyanine have advantages of non-pollution characteristic and high productivity compared with the inorganic photoconductors but generally have a low conductivity so that the commercialization thereof has been difficult. For this reason, various sensitizing methods have been proposed, and among them, the use of a unction separation-type photosensitive member including a charge generation layer and a charge transport layer in a laminated state has become predominant and has been commercialized.

On the other hand, in recent years, non-impact-type printers utilizing electrophotography have come into wide in place of conventional impact-type printers as terminal printers. Such non-impact-type printers principally comprise laser beam printers using laser light as exposure light, and as the light source thereof, semiconductor lasers have been predominantly used, in view of the cost and apparatus size thereof. The semiconductor lasers principally used currently have an oscillating wavelength in a long wavelength region of 650–820 nm, so that electrophotographic photosensitive members having a sufficient sensitivity in such a long wavelength region have been developed.

Phthalocyanine compounds are very effective charge generating materials having a sensitivity up to such a long wavelength region, and compared with conventional phthalocyanine compounds and polyvinyl carbazole, oxytitanium phthalocyanine and gallium phthalocyanine are known to have better sensitivities, and various crystal forms thereof have been disclosed, e.g., in Japanese Laid-Open Patent Application (JP-A) 61-239248, JP-A 61-217050, JP-A 62-67094, JP-A 63-218768, JP-A 64-17066, JP-A 5-98181, JP-A 5-263007 and JP-A 10-67946. Further, JP-A 7-12888 and JP-A 9-23149 have disclosed a combination of a specific azo compound with a phthalocyanine compound for providing improvements to problems accompanying such a phthalocyanine compound. However, it is still desired to develop a photosensitive member capable of providing images more free from image defects while retaining a high sensitivity characteristic.

An electrophotographic photosensitive member using a phthalocyanine is accompanied with a difficulty that generated photocarriers are liable to remain in the photosensitive layer, thus functioning as a memory for causing a potential fluctuation. While the mechanism or principle thereof has not been fully confirmed or clarified as yet, it is assumed that the above difficulty is caused by a phenomenon that electrons left in the charge generation layer moves for some reason to a boundary between the charge generation layer and the charge transport layer, or a boundary between the charge generation layer and the undercoating layer or the undercoating layer and an electroconductive layer therebelow.

As actual phenomena occurring in electrophotographic photosensitive members, electrons remaining at the boundary between the charge generation layer and the charge transport layer result in a lowering in light-part potential or dark-part potential during continuous image formation. For example, in the so-called reversal development system frequently adopted in printers at present wherein a light-potential portion is developed as an image portion developed with a toner while a dark-potential portion is left as a non-image portion, a portion of photosensitive member exposed in a previous printing cycle is caused to reach a light-part potential at a lower exposure quantity and is developed as a black ghost image in a white solid image area in a subsequent printing cycle, thus causing a noticeable ghost phenomenon (hereinafter called "positive ghost").

On the other hand, electrons remaining at the boundary between the charge generation layer and the undercoating layer or between the undercoating layer and the electroconductive layer therebelow result in an increase (or an insufficient lowering) in light part potential. When such a photosensitive member is used in the reversal development system, a portion of the photosensitive member exposed in a previous printing cycle is developed at a slower speed and is developed as a white ghost image in a back solid image area in a subsequent printing cycle, thus causing a noticeable ghost phenomenon (hereinafter called "negative ghost").

Among the above ghost phenomena, the negative ghost is liable to occur in an initial stage and the positive ghost is liable to occur in a later stage in a continuous printing (image formation). These ghost phenomena are noticeably observed especially in a photosensitive member including an undercoating adhesive layer between the charge generation layer and are particularly liable to occur in a low temperature/low humidity environment wherein the volume resistivity for electron movement in the charge generation layer and the undercoating layer is liable to increase so that the electrons are liable remain abundantly in the charge generation layer.

SUMMARY OF THE INVENTION

An object of the present invention is to provide an electrophotographic photosensitive member capable of forming images free from image defects while retaining a high sensitivity, particularly in a semiconductor laser wavelength region.

Another object of the present invention is to provide a process cartridge and an electrophotographic apparatus including an electrophotographic photosensitive member as mentioned above.

According to the present invention, there is provided an electrophotographic photosensitive member, comprising a support and a photosensitive layer disposed on the support, wherein said photosensitive layer contains a phthalocyanine pigment and an azo calix[n]arene compound represented by the formula (1) below:

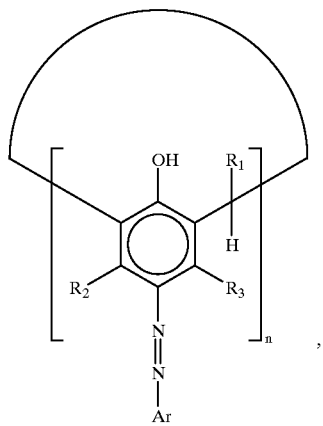

wherein n denotes an integer of 4–8; $R_1$, $R_2$ and $R_3$ independently denote a hydrogen atom or alkyl group; Ar denotes an aromatic hydrocarbon ring group capable of having a substituent, a heterocyclic group capable of having a substituent, or a combination of a plurality of these groups bonded to each other directly or via a bonding group.

The present invention further provides: a process cartridge, comprising: the above-mentioned electrophotographic photosensitive member and at least one means selected from the group consisting of charging means, developing means and cleaning means; said electrophotographic photosensitive member and said at least one means being integrally supported and detachably mountable to a main assembly of an electrophotographic apparatus; and an electrophotographic apparatus, comprising:

the above-mentioned electrophotographic photosensitive member, and charging means, developing means and transfer means respectively disposed opposite to the electrophotographic photosensitive member.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE in the drawing is a schematic illustration of an electrophotographic apparatus including a process cartridge, which in turn includes an electrophotographic photosensitive member, to which the present invention is applicable.

DETAILED DESCRIPTION OF THE INVENTION

The photosensitive layer of the electrophotographic photosensitive member according to the present invention contains a phthalocyanine pigment and an azo calix[n]arene compound of the above formula (1).

The phthalocyanine pigment may be known phthalocyanines, inclusive of metal-free phthalocyanine and metal phthalocyanines further capable of having ligands, and including oxytitanium phthalocyanine and gallium phthalocyanine as preferred examples. These phthalocyanines may basically have any crystal forms. In view of excellent sensitivities, however, it is preferred to use hydroxygallium phthalocyanine having a crystal form characterized by strong peaks at Bragg angles (2θ±0.2 deg.) of 7.4 deg. and 28.2 deg.; chlorogallium phthalocyanine having a crystal form characterized by strong peaks at Bragg angles (2θ±0.2 deg.) of 7.4 deg., 16.6 deg., 25.5 deg. and 28.3 deg.; or oxytitanium phthalocyanine having a crystal form characterized by strong peaks at a Bragg angle (2θ±0.2 deg.) of 27.2 deg., respectively according to CuKα-characteristic X-ray diffractometry. It is further preferred to use hydroxygallium phthalocyanine having a crystal form characterized by strong peaks at Bragg angles (2θ+0.2 deg.) of 7.4 deg. and 28.2 deg.; or oxytitanium phthalocyanine having a crystal form characterized by strong peaks at a Bragg angle (2θ±0.2 deg.) of 27.2 deg., respectively according to CuKα-characteristic X-ray diffractometry. More specifically, it is preferred to use hydroxygallium phthalocyanine having a crystal form characterized by strong peaks at Bragg angles (2θ±0.2 deg) of 7.3 deg., 24.9 deg. and 28.1 deg.; hydroxy gallium phthalocyanine having a crystal form characterized by strong peaks at Bragg angles (2θ±0.2 deg.) of 7.5 deg., 9.9 deg., 16.3 deg., 18.6 deg., 25.1 deg. and 28.3 deg.; oxytitanium phthalocyanine having a crystal form characterized by strong peaks at Bragg angles (2θ±0.2 deg.) of 9.0 deg., 14.2 deg., 23.9 deg. and 27.1 deg.; or oxytitanium phthalocyanine having a crystal form characterized by strong peaks at Bragg angles (2θ±0.2 deg) of 9.5 deg., 9.7 deg., 11.7 deg., 15.0 deg., 15.0 deg., 23.5 deg., 24.1 deg. and 27.3 deg., respectively according to CuKα-characteristic X-ray diffractometry.

The azo calix[n]arene compound contained in the photosensitive layer is a cyclic compound having 4 to 8 azo phenolic units (or azo phenol-aldehyde condensate units) represented by formula (1) below:

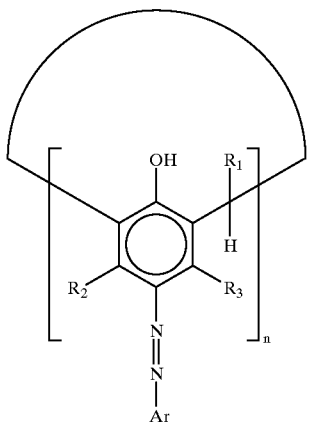

wherein n denotes an integer of 4–8; $R_1$, $R_2$ and $R_3$ independently denote a hydrogen atom or alkyl group; Ar denotes an aromatic hydrocarbon ring group capable of having a substituent, a heterocyclic group capable of having a substituent, or a combination of a plurality of these groups bonded to each other directly or via a bonding group.

Examples of the alkyl group for $R_1$, $R_2$ and $R_3$ may include methyl, ethyl and propyl, but it is particularly preferred that $R_1$, $R_2$ and $R_3$ are respectively a hydrogen atom.

Examples of the aromatic hydrocarbon ring group or heterocyclic group each capable of having a substituent for Ar may include those derived from aromatic cyclic hydrocarbon compounds, such as benzene, naphthalene, fluorene, phenanthrene, anthracene, fluoranthene, and pyrene; heterocyclic groups, such as furan, thiophene, pyridine, indole, benzothiazole, carbazole, benzocarbazole, acridone, dibenzothiophene, benzooxazole, benzotriazole, oxathiazole, thiazole, phenazine, cinnoline, and benzocinnoline. Further, a plurality of these aromatic cyclic compounds and/or heterocyclic compounds can be bonded to each other directly (via a single bond or condensed with each other) or via an aromatic or non-aromatic bonding group to provide the group Ar. Examples of such combined forms of compounds giving an Ar group may include:

triphenylamine, diphenylamine, N-methyldiphenylamine, biphenyl, terphenyl, binaphthyl, fluorenone, phenanthrenequinone, anthraquinone, benzanthrone, diphenyloxazole, phenylbenzoxazole, diphenylmethane, diphenyl sulfone, diphenyl ether, benzophenone, stilbene, distyrylbenzene, tetraphenyl-p-phenylenediamine, and tetraphenylbenzidine.

As mentioned above, these aromatic hydrocarbon ring compounds and/or heterocyclic group can have a substituent, examples of which may include:

alkyl groups, such as methyl, ethyl, propyl and butyl; alkoxy groups, such as methoxy and ethoxy; dialkylamino groups, such as dimethylamino and diethylamino; halogen atoms, such as fluorine, chlorine and bromine; hydroxy, nitro, cyano, and halomethyl.

Groups Ar including a benzene ring having an electron-attractive group, such as cyano, nitro, azdphenyl or halogen atom, are particularly preferred.

Next, preferred examples of the azo calix[n]arene used in the electrophotographic photosensitive member according to the present invention are enumerated hereinbelow with indications of particular species of Ar, $R_1$, $R_2$, $R_3$ and n in the basic formula (1):

Basic formula (1):

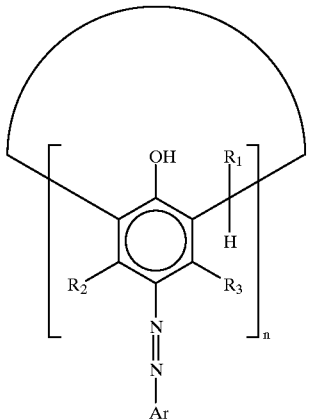

Example Compound 1

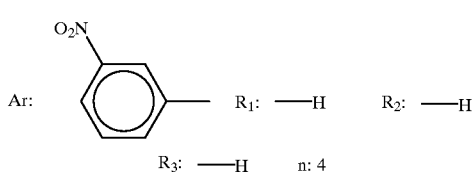

Example Compound 2

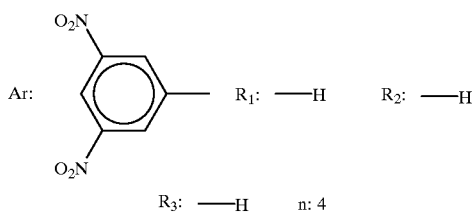

Example Compound 3

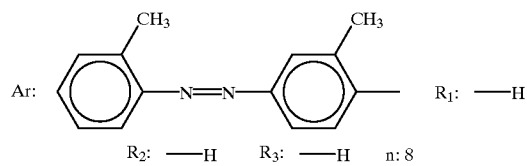

Example Compound 4

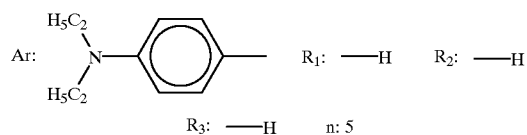

Example Compound 5

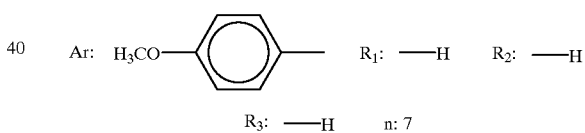

Example Compound 6

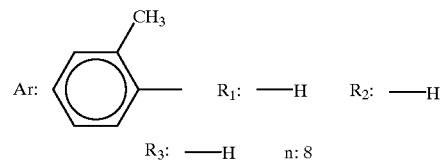

Example Compound 7

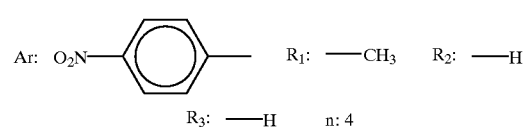

Example Compound 8

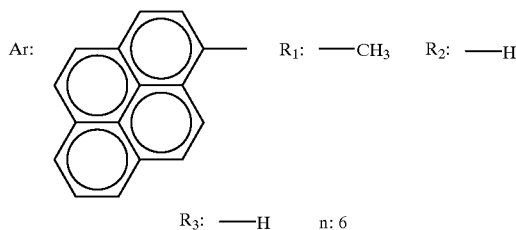

R$_1$: —CH$_3$   R$_2$: —H

R$_3$: —H   n: 6

Example Compound 9

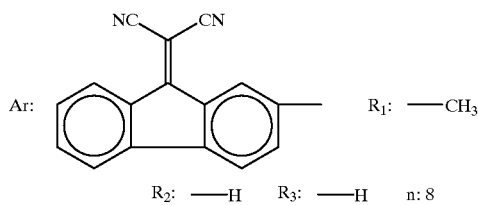

R$_1$: —CH$_3$

R$_2$: —H   R$_3$: —H   n: 8

Example Compound 10

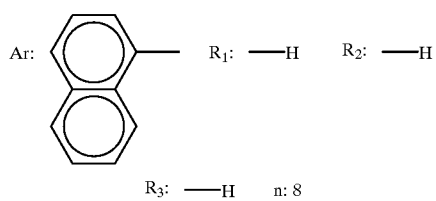

R$_1$: —H   R$_2$: —H

R$_3$: —H   n: 8

Example Compound 11

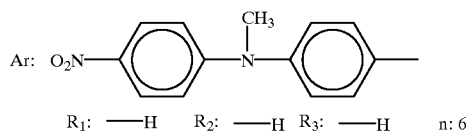

R$_1$: —H   R$_2$: —H   R$_3$: —H   n: 6

Example Compound 12

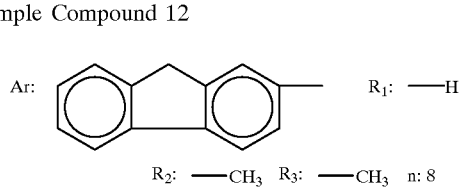

R$_1$: —H

R$_2$: —CH$_3$   R$_3$: —CH$_3$   n: 8

Example Compound 13

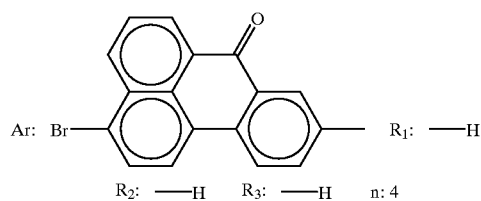

R$_1$: —H

R$_2$: —H   R$_3$: —H   n: 4

Example Compound 14

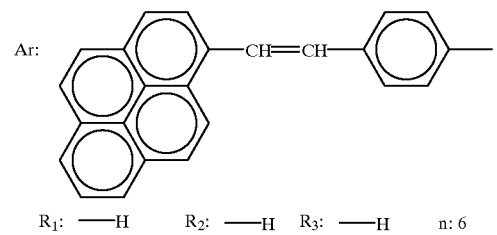

R$_1$: —H   R$_2$: —H   R$_3$: —H   n: 6

Example Compound 15

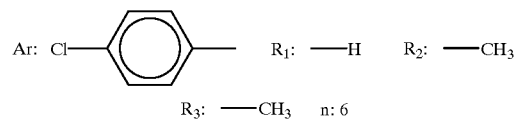   R$_1$: —H   R$_2$: —CH$_3$

R$_3$: —CH$_3$   n: 6

Example Compound 16

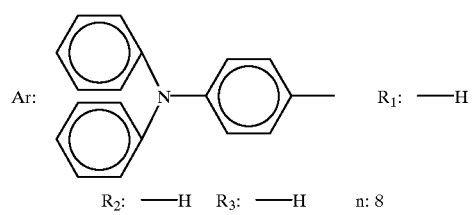   R$_1$: —H

R$_2$: —H   R$_3$: —H   n: 8

Example Compound 17

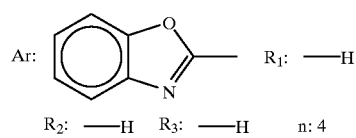   R$_1$: —H

R$_2$: —H   R$_3$: —H   n: 4

Example Compound 18

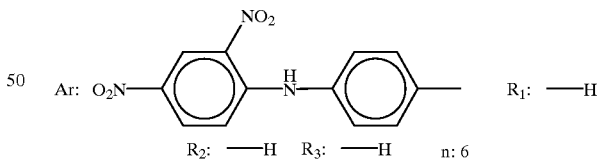   R$_1$: —H

R$_2$: —H   R$_3$: —H   n: 6

Example Compound 19

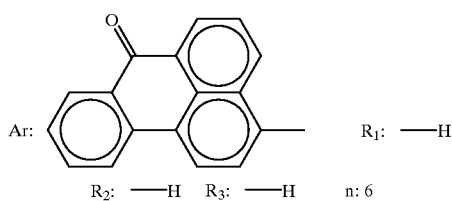   R$_1$: —H

R$_2$: —H   R$_3$: —H   n: 6

Example Compound 20

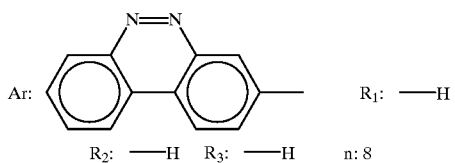

Example Compound 21

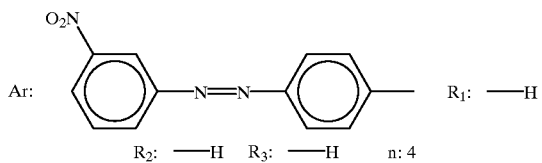

Example Compound 22

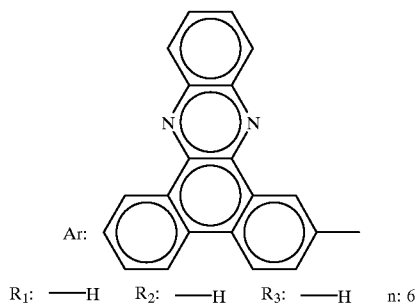

Among the above-enumerated Example Compounds, Example Compounds 1, 2, 3, 7, 15 and 21 are preferred, Example Compounds 1, 2 and 21 are further preferred, and Example Compound 21 is particularly preferred. While Examples compounds of n=4 have been frequently indicated and are preferred, calix[n]arene compounds having corresponding structures of n=6 or 8 are also preferred.

The above-mentioned azo calix[n]arene compound of the formula (1) per se is known as a charge generation agent and may be produced in a known manner as disclosed in JP-A 9-80779. More specifically, an azo calix[n]arene compound of the above formula (1) may be produced, e.g., by (1) tetrazotization of an amine according to an ordinary manner, followed by coupling with calix[n]arene in the presence of an alkali in an aqueous system, or (2) conversion of a tetrazonium salt into, e.g., a borofluoride salt or a zinc chloride complex salt, followed by coupling with calix[n]arene in the presence of a base, such as sodium acetate, triethylamine, pyridine or N-methylmorpholine in an organic solvent, such as tetrahydrofuran, N,N-dimethylformamide or dimethylsulfoxide. For example, Example Compound 1 raised above and used in Examples appearing hereinafter was prepared in the following manner, wherein "part(s)" represents part(s) by weight.

(Synthesis Example)

160 parts of water, 45 parts of conc. hydrochloric acid and 10 parts of m-nitroaniline were placed in a beaker and cooled down to 0° C. Into the mixture solution, a solution of 5.5 parts of sodium nitrate in 12 parts of water was added dropwise in 10 minutes while the liquid temperature was kept at 5° C. or below. After 40 minutes of stirring, the mixture was subjected to filtration, and to the filtrate liquid under stirring, a solution of 14 parts of sodium borofluoride in 43 parts of water was added dropwise. Then, the resultant precipitate of borofluoride salt was recovered by filtration, washed first with cold water and then with cold acetonitrileisopropyl ether mixture and then dried under vacuum at room temperature. Yield: 15 parts.

Then, 100 parts of tetrahydrofuran and 11.1 parts of calix[4]arene were placed in a beaker and then cooled to 0° C. Then, to the system, 2.4 parts of the above-prepared borofluoride salt was added and so 10 parts of pyridine was gradually added. The system was stirred for 2 hours while the liquid temperature was kept at 5° C. or below, and the content was poured into 1000 parts of cold water. Then, the precipitate was recovered by filtration, washed with chloroform and acetone and then dried under vacuum at room temperature. Yield: 2.0 parts.

The photosensitive layer on the support may have a single photosensitive layer structure containing the phthalocyanine pigment, the azo calix[n]arene of the formula (1) and a charge-transporting material in mixture in a single photosensitive layer, or a laminated photosensitive layer structure including a charge generation layer containing both the phthalocyanine pigment and the azo calix[n]arene of the formula (1), and a charge transport layer containing a charge transporting substance, disposed in this order or a reverse order on a support.

The support may comprise any material showing electroconductivity. For example, the support may comprise a metal such as aluminum or stainless steel, or a base structure of a metal, plastic or paper coated with an electroconductive layer. The support may assume a shape of a cylinder, a flat sheet or an endless belt.

It is possible to dispose an undercoating layer showing a barrier function and an adhesive function between the support and the photosensitive layer. The undercoating layer may comprise a material, such as polyvinyl alcohol, polyethylene oxide, ethyl cellulose, methyl cellulose, casein, polyamide, glue or gelatin. These materials may be dissolved in an appropriate solvent and applied on the support to form an undercoating layer of, e.g., 0.2–3.0 $\mu$m in thickness.

It is sometimes suitable to dispose an electroconductive layer between the support and the undercoating layer for the purpose of coating of irregularity or defects on the support or preventing the occurrence of interference fringes. Such an electroconductive layer may be formed in a thickness of 5–40 $\mu$m, preferably 10–30 $\mu$m, by application of a coating liquid formed by disposing electroconductive powder of carbon black, metal or metal oxides in a solution of a binder resin.

The single photosensitive layer may be formed by applying a coating liquid comprising a mixture of the phthalocyanine pigment, an azo calix[n]arene of the formula (1) and a charge-transporting substance within a solution of a binder resin on the support optionally coated with the undercoating layer, etc., followed by drying of the coating liquid.

For providing the laminated photosensitive layer, the charge generation layer may be formed by application of a coating liquid formed by dispersing the phthalocyanine pigment and the gap calix[n]arene of the formula (1) in a solution of an appropriate binder, followed by drying of the coating liquid. The charge transport layer may be formed by application of a coating liquid formed by dissolving a charge transporting material and a binder resin in a solvent, followed by drying of the coating liquid.

Examples of the charge-transporting material may include: various triarylamine compounds, hydrazone compounds, stilbene compounds, pyrazoline compounds, oxazole compounds, thiazole compounds, and triarylmethane compounds. As a charge-transporting material suitably combined with the phthalocyanine pigment and the azo calix[n]arene of the formula (1), it is preferred to use a triphenylamine compound.

Examples of the binder resin for providing the respective layers may include: polyester, acrylic resin, polyvinylcarbazole, phenoxy resin, polycarbonate, polyvinyl butyral, polystyrene, polyvinyl acetate, polysulfone, polyarylate, polyvinylidene chloride, arylonitrile copolymer and polyvinylbenzal. As a resin for dispersing the phthalocyanine pigment and the azo calix[n]arene of the formula (1) in the present invention, it is preferred to use polyvinyl butyral or/and polyvinyl benzal.

For the formation of the photosensitive layers, various coating methods may be adopted, inclusive of dipping, spray coating, spinner coating, bead coating, blade coating and beam coating.

A photosensitive layer of a single-layer structure may preferably have a thickness of 5–40 pm, particularly 10–30 $\mu$m. In a laminated photosensitive layer structure, the charge generation layer may preferably have a thickness of 0.01–10 $\mu$m, particularly 0.05–5 $\mu$m, and the charge transport layer may preferably have a thickness of 5–40 $\mu$m, particularly 10–30 $\mu$m.

The photosensitive layer of a single layer structure may preferably contain 3–30 wt. % of the phthalocyanine pigment, 0.1–10 wt. % of the azo calix[n]arene, 30–70 wt. % of the charge-transporting material, and 5–65 wt. %, preferably 10–50 wt. %, of the binder resin, respectively based on the photosensitive layer. For the photosensitive layer of a laminated structure, the charge generation layer may preferably contain 30–90 wt. %, particularly 50–80 wt. %, of the phthalocyanine pigment, 0.01–50 wt. %, particularly 0.1–10 wt. %, of the azo calix[n]arene, and 5–65 wt. %, preferably 9–65 wt. %, of the binder resin, respectively based on the charge generation layer. The charge transporting material may preferably be contained in 20–80 wt. %, particularly 30–70 wt. %, together with 20–80 wt. %, preferably 30–70 wt. % of the binder resin, of the charge transport layer. In any case, the azo calix[n]arene may preferably be contained in a proportion of 0.3–10 wt. %, particularly 0.5–5 wt. % of the phthalocyanine pigment.

The photosensitive layer can be further coated with a protective layer as desired. Such a protective layer may be formed in a thickness of preferably 0.05–20 $\mu$m by application of a solution in an appropriate solvent of a resin, such as polyvinyl butyral, polyester, polycarbonate (polycarbonate Z, modified polycarbonate, etc.), nylon, polyimide, polyarylate, polyurethane, styrene-butadiene copolymer, ethylene-acrylic acid copolymer, styreneacrylonitrile copolymer, or curable resin precursor, followed by drying and optional curing. The protective layer can further contain electroconductive particles of, e.g., metal oxides, such as tin oxide, an ultraviolet absorber, etc.

Next, some description will be made on the process cartridge and the electrophotographic apparatus according to the present invention.

The sole FIGURE in the drawing shows a schematic structural view of an electrophotographic apparatus including a process cartridge using an electrophotographic photosensitive member of the invention. Referring to the FIGURE, a photosensitive member 1 in the form of a drum is rotated about an axis 2 at a prescribed peripheral speed in the direction of the arrow shown inside of the photosensitive member 1. The peripheral surface of the photosensitive member 1 is uniformly charged by means of a primary charger 3 to have a prescribed positive or negative potential. At an exposure part, the photosensitive member 1 is imagewise exposed to light 4 (as by slit exposure or laser beam-scanning exposure) by using an image exposure means (not shown), whereby an electrostatic latent image is successively formed on the surface of the photosensitive member 1. The thus formed electrostatic latent image is developed by using a developing means 5 to form a toner image. The toner image is successively transferred to a transfer (-receiving) material 7 which is supplied from a supply part (not shown) to a position between the photosensitive member 1 and a transfer charger 5 in synchronism with the rotation speed of the photosensitive member 1, by means of the transfer charger 6. The transfer material 7 carrying the toner image thereon is separated from the photosensitive member 1 to be conveyed to a fixing device 8, followed by image fixing to print out the transfer material 7 as a copy outside the electrophotographic apparatus. Residual toner particles remaining on the surface of the photosensitive member 1 after the transfer operation are removed by a cleaning means 9 to provide a cleaned surface, and residual charge on the surface of the photosensitive member 1 is erased by a pre-exposure means issuing pre-exposure light 10 to prepare for the next cycle. When a contact charging means is used as the primary charger 3 for charging the photosensitive member 1 uniformly, when a contact (or proximity) charging means is used, the pre-exposure means may be omitted, as desired.

According to the present invention, in the electrophotographic apparatus, it is possible to integrally assemble a plurality of elements or components thereof, such as the above-mentioned photosensitive member 1, the primary charger (charging means) 3, the developing means and the cleaning means 9, into a process cartridge detachably mountable to the apparatus main body, such as a copying machine or a laser beam printer. The process cartridge may, for example, be composed of the photosensitive member 1 and at least one of the primary charging means 3, the developing means 5 and cleaning means 9, which are integrally assembled into a single unit capable of being attached to or detached from the apparatus body by the medium of a guiding means such as a rail of the apparatus body. In the case where the electrophotographic apparatus constitutes a copying machine or a printer, the exposure light 4 may be provided as reflected light or transmitted light from an original, or alternatively provided as image-carrying illumination light formed by reading an original by a sensor, converting the read data into signals and driving a laser beam scanner, an LED array or a liquid crystal shutter array.

Hereinbelow, the present invention will be described more specifically with reference to Examples and Comparative Examples wherein "parts" and "%" used for describing a relative amount of a component or a material are by weight unless specifically noted otherwise.

EXAMPLE 1

50 parts of titanium oxide powder coated with tin oxide containing 10% of antimony oxide, 25 parts of resol-type phenolic resin, 20 parts of methyl cellosolve, 5 parts of methanol and 0.002 part of silicone oil (polydimethylsiloxane-polyoxyalkylene copolymer, average molecular weight=3000), were dispersed for 2 hours in a sand mill containing 1 mm-dia. glass beads, to prepare an electroconductive paint. An aluminum cylinder (of 30 mm in diameter and 260.5 mm in length) was coated by dipping within the above-prepared electroconductive paint, followed by drying at 140° C. for 30 min. to form a 20 μm-thick electroconductive layer.

The aluminum cylinder was further coated by dipping within a solution of 5 parts of 6-66-610-12 quaternary polyamide copolymer resin in a solvent mixture of 70 parts of methanol and 25 parts of butanol, followed by drying, to form a 1 μm-thick undercoating layer.

Separately, 10 parts of hydroxygallium phthalocyanine having a crystal form characterized by strong peaks at Bragg angles (2θ±0.2 deg.) of 7.5 deg., 9.9 deg., 16.3 deg., 18.6 deg., 25.1 deg. and 28.3 deg., 10 parts of Example Compound 1 (azo calix[4]arene compound) described before and 5 parts of polyvinyl butyral resin ("S-LEC BX-1", available from Sekisui Kagaku Kogyo K. K.), were added to 250 parts of cyclohexanone, and the mixture was subjected to 1 hour of dispersion in a sand mill containing 1 mm-dia. glass beads and then diluted with 250 parts of ethyl acetate to obtain a paint. The paint was applied by dipping onto the undercoating layer and dried at 100° C. for 10 min. to form a 0.16 μm-thick charge generation layer.

Then, 10 parts of a charge-transporting material of the following structural formula:

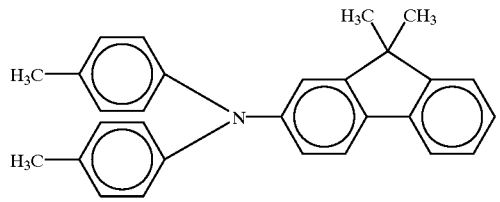

and 10 pats of polycarbonate resin ("IUPILON Z-200", available from Mitsubishi Gas Kagaku K. K.) were dissolved in 70 parts of monochlorobenzene to form a coating solution, which was then applied by dipping on the above-formed charge generation layer on the aluminum cylinder and dried at 110° C. for 1 hour, to form a 25 μm-thick charge transport layer, thus providing an electrophotographic photosensitive member.

EXAMPLE 2

An electrophotographic photosensitive member was prepared in the same manner as in Example 1 except for reducing the amount of Example Compound 1 to 0.1 part in the charge generation layer-forming paint.

EXAMPLE 3

An electrophotographic photosensitive member was prepared in the same manner as in Example 1 except for increasing the amount of Example Compound 1 to 1 part in the charge generation layer-forming paint.

EXAMPLE 4

An electrophotographic photosensitive member was prepared in the same manner as in Example 1 except for using Example Compound 2 (azo calix[4]arene compound) described before instead of Example Compound 1 in the charge generation layer-forming paint.

EXAMPLE 5

An electrophotographic photosensitive member was prepared in the same manner as in Example 1 except for using Example Compound 3 (azo calix[8]arene compound) described before instead of Example Compound 1 in the charge generation layer-forming paint.

EXAMPLE 6

An electrophotographic photosensitive member was prepared in the same manner as in Example 1 except for using Example Compound 21 (azo calix[4]arene compound) described before instead of Example Compound 1 in the charge generation layer-forming paint.

EXAMPLE 7

An electrophotographic photosensitive member was prepared in the same manner as in Example 1 except for replacing the hydroxygallium phthalocyanine with oxytitanium phthalocyanine having a crystal form characterized by strong peaks at Bragg angles (2θ±0.2 deg.) of 9.0 deg., 14.2 deg., 23.9 deg. and 27.1 deg. in the charge generation layer-forming paint.

EXAMPLE 8

The steps of Example 1 were repeated up to the formation of the charge generation layer.

Then, 10 parts of a charge-transporting material of the following structural formula:

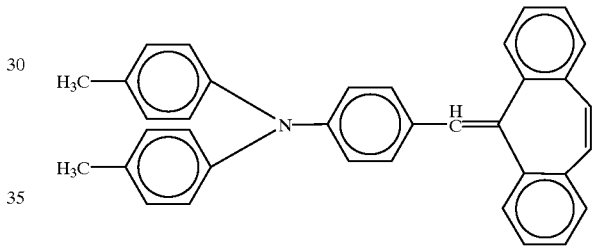

and 10 parts of polycarbonate resin ("IUPILON Z-400", available from Mitsubishi Gas Kagaku K. K.) were dissolved in 100 parts of monochlorobenzene to form a coating solution, which was then applied by dipping on the above-formed charge generation layer and dried at 150° C. for 30 min. to form a 15 μm-thick charge transport layer, thus providing an electrophotographic photosensitive member.

EXAMPLE 9

The steps of Example 1 were repeated up to the formation of the charge generation layer.

Then, 7 parts of a charge-transporting material of the following structural formula:

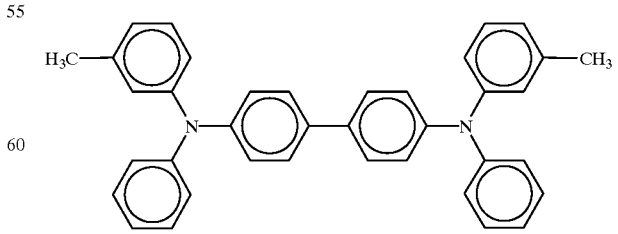

3 parts of a charge-transporting material of the following structural formula:

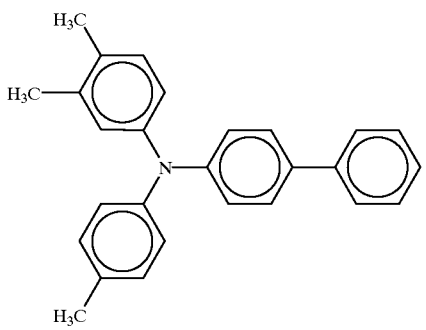

and 10 parts of polycarbonate resin ("IUPILON Z-200", available from Mitsubishi Gas Kagaku K. K.) were dissolved in 70 parts of monochlorobenzene to form a coating solution, which was then applied by dipping on the above-formed charge generation layer and dried at 110° C. for 30 min. to form a 32 μm-thick charge transport layer, thus providing an electrophotographic photosensitive member.

Comparative Example 1

An electrophotographic photosensitive member was prepared in the same manner as in Example 1 except for omitting Example Compound 1 (azo calix[4]arene compound) from the charge generation layer-forming paint.

Comparative Example 2

An electrophotographic photosensitive member was prepared in the same manner as in Example 7 except for omitting Example Compound 1 (azo calix[4]arene compound) from the charge generation layer-forming paint.

Comparative Example 3

An electrophotographic photosensitive member was prepared in the same manner as in Example 1 except for replacing Example Compound 1 (azo calix[4]arene compound) in the charge generation layer-forming paint with 3 parts of a bisazo pigment of the following structural formula:

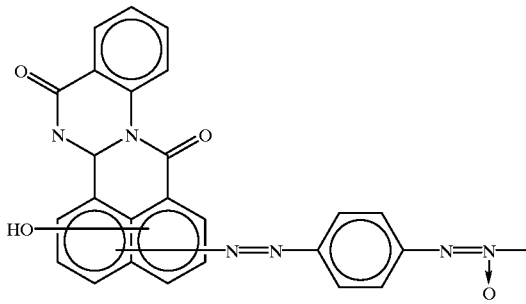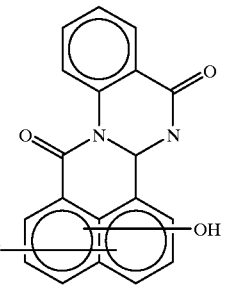

Each of the above-prepared electrophotographic photosensitive members was evaluated with respect to light-part potential ($V_L$) and ghost images by incorporating it into a process cartridge of a commercially available laser beam printer ("Laser Jet 4000", available from Hewlett-Packard Co.) after remodeling for allowing potential measurement on the photosensitive member. More specifically, first, in an environment of 23° C. and 55% RH, light part potential measurement and ghost image evaluation were performed at an initial stage, and then a continual image formation was performed on 1000 sheets. Then, the light-part potential ($V_L$) measurement and ghost image evaluation were performed immediately after and 15 hours after the continual image formation. In any case, the photosensitive member was primarily charged to provide a dark potential ($V_D$) of 600 volts.

Then, each photosensitive member and the laser beam printer were left standing for 3 days in a low temperature/low humidity environment of 15° C./10% RH, and then the light-part potential ($V_L$) measurement and ghost image evaluation were again performed.

The continual image formation was performed according to an intermittent mode at a rate of 4 sheets/min. for reproducing ca. 0.5 mm-wide lines at a longitudinal pitch of 10 mm.

The ghost image evaluation was performed by printing an arbitrary number of 5 mm-square black marks for one drum (photosensitive member) circumference, followed by printing of a halftone image (at a dot density of 1 dot and 1 space appearing alternately) and alternatively a solid white image over a whole area. The ghost image samples were taken at apparatus development volume levels of F5 (central value) and F9 (lowest density), respectively.

The ghost image evaluation was performed at the following 4 ranks based on samples according to totally 4 modes.

Rank 1: No ghost was recognized at all according to any mode.

Rank 2: Slight ghost was recognized according to a specific mode.

Rank 3: Slight ghost was recognized according to all the modes.

Rank 4: Ghost was observed according to all the modes.

The results are inclusively shown in the following Table 1.

As shown in Table 1, the photosensitive members of Examples provided images with suppressed ghost while retaining a high sensitivity in a semiconductor wavelength region.

TABLE 1

| | 23° C./55% RH | | | | | | | |
|---|---|---|---|---|---|---|---|---|
| | | | Continual imageformation | | | | | |
| | Initial | | Immediately after | | 15 hours after | | 15° C./10% RH | |
| Example | $V_L$ (volts) | Ghost | $V_L$ (volts) | Ghost | $V_L$ (volts) | Ghost | $V_L$ (volts) | Ghost |
| 1 | 100 | 2 | 100 | 2 | 100 | 2 | 105 | 3 |
| 2 | 105 | 2 | 105 | 2 | 105 | 2 | 115 | 3 |
| 3 | 80 | 2 | 90 | 3 | 90 | 2 | 90 | 3 |
| 4 | 120 | 2 | 120 | 2 | 120 | 2 | 130 | 3 |
| 5 | 115 | 3 | 110 | 3 | 110 | 3 | 120 | 3 |
| 6 | 115 | 2 | 115 | 2 | 115 | 2 | 125 | 3 |
| 7 | 150 | 1 | 140 | 2 | 145 | 2 | 170 | 3 |
| 8 | 120 | 1 | 120 | 1 | 120 | 1 | 130 | 2 |
| 9 | 100 | 3 | 95 | 3 | 100 | 3 | 105 | 3 |
| Comp. 1 | 110 | 3 | 95 | 4 | 95 | 3 | 120 | 4 |
| Comp. 2 | 155 | 2 | 135 | 4 | 140 | 3 | 180 | 4 |
| Comp. 3 | 165 | 2 | 170 | 4 | 165 | 3 | 185 | 4 |

What is claimed is:

1. An electrophotographic photosensitive member, comprising a support and a photosensitive layer disposed on the support, wherein said photosensitive layer contains (a) a phthalocyanine pigment and (b) from 0.3–10 wt. %, based on the phthalocyanine pigment, of an azo calix[n]arene compound represented by the formula (1) below:

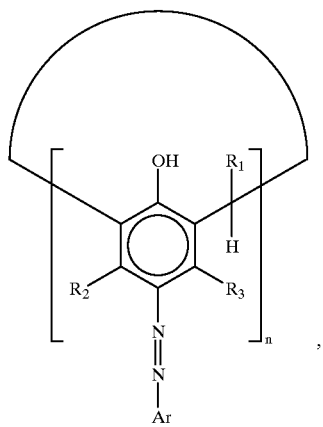

(1)

wherein n denotes an integer of 4–8; $R_1$, $R_2$ and $R_3$ independently denote a hydrogen atom or alkyl group; Ar denotes an aromatic hydrocarbon ring group capable of having a substituent, a heterocyclic group capable of having a substituent, or a combination of a plurality of these groups bonded to each other directly or via a bonding group.

2. An electrophotographic photosensitive member according to claim 1, wherein said phthalocyanine pigment comprises oxytitanium phthalocyanine.

3. An electrophotographic photosensitive member according to claim 2, wherein said oxytitanium phthalocyanine has a crystal form characterized by a strong peak at a Bragg angle (2θ±0.2 deg.) of 27.2 deg. according to CuKα-characteristic X-ray diffractometry.

4. An electrophotographic photosensitive member according to claim 3, wherein said oxytitanium phthalocyanine has a crystal form characterized by strong peaks at Bragg angles (2θ±0.2 deg.) of 9.0 deg., 14.2 deg., 23.9 deg. and 27.1 deg. according to CuKα-characteristic X-ray diffractometry.

5. An electrophotographic photosensitive member according to claim 3, wherein said oxytitanium phthalocyanine has a crystal form characterized by strong peaks at Bragg angles (2θ±0.2 deg.) of 9.5 deg., 9.7 deg., 11.7 deg., 15.0 deg., 23.5 deg., 24.1 deg. and 27.3 deg. according to CuKα-characteristic X-ray diffractometry.

6. An electrophotographic photosensitive member according to claim 1, wherein said phthalocyanine pigment comprises gallium phthalocyanine.

7. An electrophotographic photosensitive member according to claim 6, wherein said gallium phthalocyanine is hydroxygallium phthalocyanine.

8. An electrophotographic photosensitive member according to claim 7, wherein said hydroxygallium phthalocyanine has a crystal form characterized by strong peaks at Bragg angles (2θ±0.2 deg.) of 7.4 deg. and 28.2 deg. according to CuKa-characteristic X-ray diffractometry.

9. An electrophotographic photosensitive member according to claim 8, wherein said hydroxygallium phthalocyanine has a crystal form characterized by strong peaks at Bragg angles (2θ±0.2 deg.) of 7.3 deg., 24.9 deg., and 28.1 deg. according to CuKα-characteristic X-ray diffractometry.

10. An electrophotographic photosensitive member according to claim 8, wherein said hydroxygallium phthalocyanine has a crystal form characterized by strong peaks at Bragg angles (2θ±0.2 deg.) of 7.5 deg., 9.9 deg., 16.3 deg., 18.6 deg., 25.1 deg., and 28.3 deg. according to CuKα-characteristic X-ray diffractometry.

11. An electrophotographic photosensitive member according to claim 1, wherein said Ar in the formula (1) includes a benzene ring having a substituent attached thereto selected from the group consisting of cyano group, nitro group, azophenyl group and halogen atom.

12. An electrophotographic photosensitive member according to claim 1, wherein in the formula (1), said $R_1$, $R_2$ and $R_3$ are each hydrogen atom, and said Ar is 3-nitrophenyl group.

13. An electrophotographic photosensitive member according to claim 1, wherein in the formula (1), said $R_1$, $R_2$ and $R_3$ are each hydrogen atom, and said Ar is 3,5-dinitrophenyl group.

14. An electrophotographic photosensitive member according to claim 1, wherein in the formula (1), said $R_1$, $R_2$ and $R_3$ are each hydrogen atom, and said Ar is 4-(3-nitrophenyl)azophenyl group.

15. An electrophotographic photosensitive member according to claim 1, wherein said photosensitive layer has a laminated structure including a charge generation layer containing said phthalocyanine pigment and said azo calix[n]arene compound, and a charge transport layer.

16. A process cartridge, comprising:

an electrophotographic photosensitive member and at least one means selected from the group consisting of charging means, developing means and cleaning means; said electrophotographic photosensitive member and said at least one means being integrally supported and detachably mountable to a main assembly of an electrophotographic apparatus, wherein said electrophotographic photosensitive member comprises a support and a photosensitive layer disposed on the support, wherein said photosensitive layer contains (a) a phthalocyanine pigment and (b) from 0.3–10 wt. %, based on the phthalocyanine pigment, of an azo calix[n]arene compound represented by the formula (1) below:

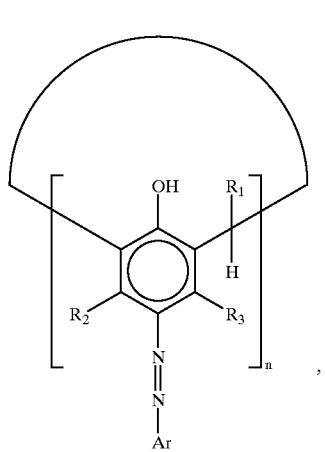

(1)

wherein n denotes an integer of 4–8; $R_1$, $R_2$ and $R_3$ independently denote a hydrogen atom or alkyl group; Ar denotes an aromatic hydrocarbon ring group capable of having a substituent, a heterocyclic group capable of having a substituent, or a combination of a plurality of these groups bonded to each other directly or via a bonding group.

17. An electrophotographic apparatus, comprising:

an electrophotographic photosensitive member, and charging means, developing means and transfer means respectively disposed opposite to the electrophotographic photosensitive member, wherein said electrophotographic photosensitive member comprises a support and a photosensitive layer disposed on the support, wherein said photosensitive layer contains (a) a phthalocyanine pigment and (b) from 0.3–10 wt. %, based on the phthalocyanine pigment, of an azo calix[n]arene compound represented by the formula (1) below:

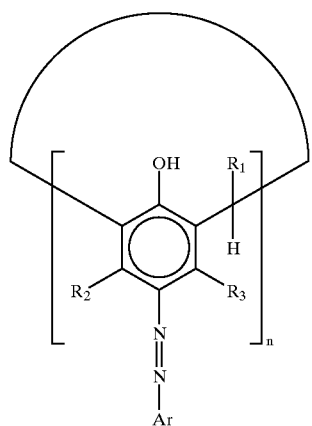

(1)

wherein n denotes an integer of 4–8; $R_1$, $R_2$ and $R_3$ independently denote a hydrogen atom or alkyl group; Ar denotes an aromatic hydrocarbon ring group capable of having a substituent, a heterocyclic group capable of having a substituent, or a combination of a plurality of these groups bonded to each other directly or via a bonding group.

* * * * *

UNITED STATES PATENT AND TRADEMARK OFFICE
CERTIFICATE OF CORRECTION

PATENT NO. : 6,335,132 B1
DATED : January 1, 2002
INVENTOR(S) : Masato Tanaka et al.

It is certified that error appears in the above-identified patent and that said Letters Patent is hereby corrected as shown below:

Title page,
Item [56], FOREIGN PATENT DOCUMENTS,
"217050" should read -- 61-217050 --;
"239248" should read -- 61-239248 --;
"67094" should read -- 62-67094 --;
"218768" should read -- 63-218768 --;
"17066" should read -- 64-17066 --;
"98181" should read -- 5-98181 --;
"263007" should read -- 5-263007 --; and
"67946" should read -- 10-67946 --.
Item [57], ABSTRACT, "ghost," should read -- ghost images, --.

Column 1,
Line 29, "wide" should read -- wide use --; and
Line 65, "moves" should read -- move --.

Column 2,
Line 45, "liable" should read -- liable to --.

Column 3,
Line 30, "means;" should read -- means, --.

Column 4,
Line 25, "15.0 deg.," (second occurrence) should be deleted.

Column 5,
Line 9, close up right margin; and
Line 21, close up right margin.

Column 10,
Line 10, "so" should be deleted; and
Line 60, "gap" should read -- azo --.

Column 11,
Line 21, "5-40 pm," should read -- 5-40 $\mu$m, --.

UNITED STATES PATENT AND TRADEMARK OFFICE
CERTIFICATE OF CORRECTION

PATENT NO.    : 6,335,132 B1
DATED         : January 1, 2002
INVENTOR(S)   : Masato Tanaka et al.

It is certified that error appears in the above-identified patent and that said Letters Patent is hereby corrected as shown below:

Column 12,
Line 13, "charger 5" should read -- charger 6 --.

Column 13,
Line 33, "pats" should read -- parts --.

Column 17,
Table 1, "imageformation" should read -- image formation --.

Column 19,
Line 6, "means;" should read -- means, --.

Signed and Sealed this

Seventh Day of May, 2002

Attest:

Attesting Officer

JAMES E. ROGAN
*Director of the United States Patent and Trademark Office*